United States Patent Office 3,184,289

Patented May 18, 1965

3,184,289

PROCESS FOR THE PREPARATION OF A PURIFIED POTASSIUM SILICATE SOLUTION

William L. Gray, North Augusta, S.C., assignor to E. I. du Pont de Nemours and Company, Wilmington, Del., a corporation of Delaware No Drawing. Filed Oct. 19, 1962, Ser. No. 231,838
4 Claims. (Cl. 23—110)

This invention relates to processes for producing non-turbid potassium silicate solutions from copper-containing silica sand, said silicate solutions being adapted for use as a suspending and cementing agent for phosphors in making television tubes. More particularly, the invention is directed to such processes in which the copper-containing silica sand is fused with a potassium alkali to form a potassium silicate glass, the glass is dissolved in water to form a solution, a sulfide of a metal of the group consisting of zinc and cadmium, in finely divided form, is mixed with the solution, and suspended solids are separated from the solution.

Luminescent screens of the type used in cathode-ray television tubes are commonly prepared by suspending the luminescent phosphor or mixtures of phosphors in an aqueous solution of potassium silicate, pouring the suspension in a television tube, and allowing the phosphor to settle on the face of the tube. It is essential that the phosphor form a uniform and adherent coating which is unimpaired when the liquid is removed and the coating is dried in the course of further processing.

The settling process just described is old in the art and in itself is no part of the present invention. Further details of the settling process and materials used thereon can be found in the Journal of Electrochemical Society, volume 99, No. 4, page 164, in an article entitled "Liquid Settled Luminescent Screens," by Pakswer and Intiso, and in volume 95, page 112 of the same journal in an article by Sadowski entitled "The Preparation of Luminescent Screens." The present invention is, rather, directed to methods for the preparation of potassium silicate solutions which are more suitable for use in the settling process than the potassium silicate heretobefore available.

Television tubes made according to the methods just described sometimes exhibit an undesirable green fluorescence in use. While this green fluorescence is considered objectionable, methods for eliminating it have not hitherto been apparent.

Now according to the present invention it has been found that the green fluorescence just mentioned is attributable to the potassium silicate solution used in the settling process for applying the phosphors, that it occurs when the potassium silicate is made from silica sand containing copper as an impurity, and that it can be corrected by mixing a sulfide of zinc or cadmium in finely divided form with the potassium silicate solution and thereafter separating the suspended solids from the solution.

It has further been found that the potassium silicate solutions prepared as just described have an uncommonly high degree of freedom from turbidity and that the wet and dry adhesion of phosphors settled onto luminescent screens from such potassium silicate solution is not deleteriously affected.

According to the invention copper in the potassium silicate solutions can be cut down to .06 part per million or even less. The copper gets into the solution from the raw materials employed in making the silicate glass and mainly from the silica sand. Although the sand used is ordinarily the purest commercially available, nevertheless the minor traces of copper impurity are carried into the potassium silicate made therefrom, normally giving up to .16 part per million or even more copper in the finished commodity. By finished commodity is meant the potassium silicate solution which normally contains from 28 to 36% by weight of solids. It is not feasible to remove the copper impurity from the silica sand because the amount involved is, at the highest, very small.

The mechanism whereby zinc or cadmium sulfide are able to remove copper substantially quantitatively from potassium silicate solutions in the processes of this invention is not entirely clear. It is not explained by assuming a metathetical reaction wherein copper sulfide is precipitated out because it is less soluble than the zinc or cadmium sulfide, since if this were the case, more soluble sulfides such as sodium sulfide should give equally good results. However, experience has shown that the more soluble sulfides are not effective uniformly and repetitively to produce results. It appears, rather, that the copper is fitted into the zinc or cadmium sulfide latice under the conditions of the process and is thereby removed from solution. While this explanation appears to fit the facts it is not to be construed as a limitation upon the scope of the novel processes, the scope of the invention by the appended claims.

To practice a process of this invention the copper-containing silica sand is first fused with a potassium alkali to form a potassium silicate glass. This can be done in a conventional glass furnace according to techniques with which the art is already familiar. The potassium alkali can be, for example, a potassium hydroxide. In other words, the prior practices of the art are sufficient to place the copper in a form in which it can be treated out by the subsequent steps of the process.

The potassium silicate melt is solidified and broken up into a size which will dissolve most readily in a subsequent dissolving step. The customary practice is to cool and fracture the glass in thin layers. If desired, the glass can be quenched in water as a means of fracturing it.

Techniques for dissolving potassium silicate glass as hitherto practiced are also adequate to bring the copper impurity into the solution in a form from which it can be treated out by the novel sulfide treatment. The glass is dissolved in water, preferably at elevated temperatures to speed the solution. Even higher temperatures can be employed by using a pressurized dissolver. Thus, for instance, it is preferred to dissolve at a temperature in the range of 285° to 320° F. by using steam in the dissolver under forty pounds per square inch gage pressure. The proportions of glass and water are preferably so selected as to give a solution of 29 to 38° Bé. as measured at 60° F., equivalent to 28 to 37½% solids in the solution.

The sulfide treatment of the potassium silicate solution is accomplished by mixing the sulfide with the solution, the sulfide being in finely divided form. It is preferred that the sulfide be a fine powder, at least pass a 100-mesh screen, but it can be somewhat coarser if used in larger proportion and more extended treating time.

The sulfide used is a sulfide of a metal selected from the group consisting of zinc and cadmium. Thus, the sulfide can be zinc sulfide, cadmium sulfide, or a mixed sulfide of zinc and cadmium such as one containing equimolar proportions of zinc sulfide and cadmium sulfide.

The finely divided zinc or cadmium sulfide can be added directly to the potassium silicate solution. If desired, it can be added to the dissolver for the potassium silicate glass. Care should be taken to effect distribution of the sulfide throughout the body of the potassium silicate solution being treated. This is done by providing adequate agitation of the solution at the point of addition. It is facilitated by slurrying the powder in a small amount of water and then adding the slurry to the silicate solution with agitation. Such a slurry can advantageously contain 25% by weight or even more of the sulfide powder.

The mixing of the sulfide with the silicate solution is continued until it is certain that the sulfide is uniformly distributed throughout the solution and that there has been adequate time for the copper to come in contact with the sulfide and interact with it. The time can be shortened somewhat by moderately increasing the temperature. In a typical plant scale operation using air agitation of a 5000-gallon tank a twenty-four hour mixing time at temperatures of 90° to 140° F. is used.

The proportion of sulfide used, based on the weight of silicate solution, is relatively small. As little as 0.01% by weight is used to advantage when sulfide is added to the potassium silicate solution and still lesser amounts are effective when adding the sulfide directly to the dissolver. The amount of sulfide used can range upwardly to 0.1% and even higher since any excess will subsequently be removed. However, amounts larger than 0.1% ordinarily accomplish no substantial additional removal of copper and hence are merely wasteful.

For the amounts of copper usually present in the high-grade silica sand used to make the potassium silicate, the minimum amount of sulfide above mentioned (.01%) represents a many-fold excess over the stoichiometric requirement for precipitating the copper as copper sulfide. This further suggests that the mechanism of copper removal is not merely a precipitation as copper sulfide, but rather some other phenomenon such as fitting of the copper into the space lattice of the suspended sulfide.

It will further be noted that the zinc and cadmium sulfide used in the processes of this invention are insoluble in water and in the potassium silicate solution and would be so classed by any accepted definition of the term "insoluble." The excess sulfide remains in suspension in the treated potassium silicate solution at this point of the process giving it a milky appearance. There is no black precipitate apparent as would be the case if copper were precipitated as copper sulfide.

The considerations determinative of the time allowed for the treating step have already been discussed above, but it is further to be noted that other things being equal the time of mixing is inversely proportional to the amount of sulfide used; that is, the higher the amount of sulfide the shorter will be the mixing time required. However, it is ordinarily not economically feasible to increase the proportion of sulfide beyond the amounts indicated merely to reduce the mixing time.

After the sulfide treatment as just described has been completed, suspended solids are separated from the potassium silicate solution. Techniques for removing suspended solids from liquids are, of course, conventional and such methods can be adapted to the removal of solids in the processes of the present invention.

The suspended solids can be removed, for instance, by centrifuging. This method sometimes does not give the desired clarity of product unless the centrifuging is continued at very high speeds for prolonged periods. Similarly, settling and decantation are effective only if very long settling times are used.

A preferred method for removing the suspended solids from the potassium silicate solution is by filtration. A plate and frame filter press in which the filter cloth has been precoated with a filter aid of the diatomaceous earth type gives particularly satisfactory results and is preferred. The filtrate is water-clear and is thus especially suited for use in the manufacture of luminescent screens in cathode-ray tubes. The filtrate remarkably leads to no green fluorescence in the use of such tubes.

After filtration the potassium silicate can be adjusted to any desired specifications, taking precautions, of course, that such impurities as copper are not re-introduced into the solution. Thus, the $SiO_2$:$K_2O$ ratio can be adjusted downwardly, if required, by adding copper-free potassium hydroxide solution. The concentration can be reduced by diluting with copper-free water.

It has been found that the filter cake obtained by filtering the treated solution containing the filtered metal contains the copper impurity originally present in the silica sand. However, the copper content is quite low when a large excess of treating sulfide is used. Accordingly, a very substantial excess of treating sulfide can be employed economically if the filter cake is reused in the process. Ordinarily this would be done by using a large excess of the sulfide, settling most of it after the treating step, and reusing the settled sulfide. The decanted potassium silicate solution in such a process would advantageously be filtered through a precoated filter to remove the last traces of suspended matter.

The invention will be better understood by reference to the following illustrative examples:

*Example 1*

A 1,000 gram portion of 30½° Bé. potassium silicate of 2.07 $SiO_2/K_2O$ weight ratio is placed in a one-quart screw cap polyethylene bottle. The bottle is then placed in a hot water bath regulated at 50–65° C. and 0.3 gram of zinc sulfide is added . The mixture is agitated mechanically for 1½ hours, withdrawn and filtered. The potassium silicate filtrate is then used as the settling medium for television phosphors onto a screen. Upon excitation, the resulting screen exhibits a total lack of undesired green fluorescence whereas an untreated identical sample of potassium silicate solution used in an identical manner causes a highly objectionable amount of green fluorescence, as measured by standard comparative tests.

*Example 2*

Example 1 is repeated except that the treatment with zinc sulfide takes place over a 5 hour period at 25° C., with similarly outstanding results.

*Example 3*

Example 1 is repeated except that 2.50 $SiO_2/K_2O$ ratio and 31° Bé. potassium silicate is used, 0.10% by weight zinc sulfide is used, and the treatment continued for 18 hours at about 60° C. Phosphor screens made using the treated silicate solution as the settling medium likewise show complete absence of undesired green fluorescence.

*Example 4*

Potassium silicate solution, of 2.50 $SiO_2/K_2O$ weight ratio and Ca 29½° Bé., is obtained from 273 grams of potassium silicate glass, 727 grams of deionized water and 0.033 percent by weight of ZnS charged to a rotating pressurized autoclave and maintained at 40 pounds per square inch gage pressure for 2½ hours. The resulting solution is cooled, filtered and the filtrate used to prepare a phosphor screen which does not have objectionable green emission upon excitation.

*Example 5*

Example 4 is repeated, with 360 grams of glass and 640 grams of water, a 2.14 $SiO_2/K_2O$ ratio and 37.2° Bé., using 0.02 percent ZnS, with similarly excellent results.

*Examples 6–9*

The preceding examples are repeated, using in place of the indicated amounts of ZnS, the following, by weight:

| | |
|---|---|
| Example 6 | 0.2% Cds. |
| Example 7 | 0.1% CdS. |
| Example 8 | 0.1% CdS and 0.1% ZnS. |
| Example 9 | 0.05% CdS and 0.05% ZnS. |

Satisfactory results are obtained in each instance.

*Example 10*

About 350 gallons of potassium silicate solution at 30.5° Bé. and 2.03 $SiO_2/K_2O$ weight ratio are added to a tank and heated to 54° C. A slurry of 3.5 pounds of ZnS in water is added to the tank so that final concentration in the tank is 0.1% ZnS by weight. The mixture is agitated for 16 hours at 54° C. and filtered. The filtrate potassium silicate solution is used to settle phosphors in conventional manner onto a television screen and the resulting screen has no green fluorescence.

I claim:

1. In a process for producing a potassium silicate solution from a copper containing silica sand, in which the sand is fused with a potassium alkali to form a potassium silicate glass and the glass is dissolved in water to form a potassium silicate solution, the removal of copper from the potassium silicate solution by the steps comprising mixing with the copper containing potassium silicate solution from 0.01 to 0.1% by weight based on the weight of the silicate solution of a finely divided sulfide of a metal selected from the group consisting of zinc and cadmium, continuing such mixing for a time sufficient to allow intimate contact of the sulfide with the copper, thereafter separating the suspended copper containing solids from the solution, and recovering the potassium silicate solution.

2. In a process for producing a potassium silicate solution from a copper containing silica sand, in which the sand is fused with a potassium alkali to form a potassium silicate glass and the glass is dissolved in water to form a potassium silicate solution, the removal of copper from the potassium silicate solution by the steps comprising mixing with the copper containing potassium silicate solution from 0.01 to 0.1% by weight based on the weight of the silicate solution of a finely divided sulfide of a metal selected from the group consisting of zinc and cadmium, continuing such mixing for a time sufficient to allow intimate contact of the sulfide with the copper, thereafter filtering the suspended copper containing solids from the solution, and recovering the potassium silicate solution.

3. In a process for producing a potassium silicate solution from a copper containing silica sand, in which the sand is fused with a potassium alkali to form a potassium silicate glass and the glass is dissolved in water to form a potassium silicate solution, the removal of copper from the potassium silicate solution by the steps comprising mixing with the copper containing potassium silicate solution from 0.01 to 0.1% by weight based on the weight of the silicate solution of a finely divided zinc sulfide, continuing such mixing for a time sufficient to allow intimate contact of the sulfide with the copper, thereafter separating the suspended copper containing solids from the solution, and recovering the potassium silicate solution.

4. In a process for producing a potassium silicate solution from a copper containing silica sand, in which the sand is fused with a potassium alkali to form a potassium silicate glass and the glass is dissolved in water to form a potassium silicate solution, the removal of copper from the potassium silicate solution by the steps comprising mixing with the copper containing potassium silicate solution from 0.01 to 0.1% by weight based on the weight of the silicate solution of a finely divided cadmium sulfide, continuing such mixing for a time sufficient to allow intimate contact of the sulfide with the copper, thereafter separating the suspended copper containing solids from the solution, and recovering the potassium silicate solution.

References Cited by the Examiner

UNITED STATES PATENTS

| | | | |
|---|---|---|---|
| 2,783,129 | 2/57 | Baral | 23—110.1 |
| 2,784,060 | 3/57 | Santmyers | 23—110.1 |

MAURICE A. BRINDISI, *Primary Examiner.*

BENJAMIN HENKIN, *Examiner.*